United States Patent [19]
VanHorn et al.

[11] Patent Number: 5,736,726
[45] Date of Patent: Apr. 7, 1998

[54] PORTABLE DATA COLLECTION DEVICE HAVING REMOVABLE HANDLE AND BATTERY

[75] Inventors: David B. VanHorn, Columbia Station; Gary Kochis, Uniontown, both of Ohio

[73] Assignee: Telxon Corporation, Akron, Ohio

[21] Appl. No.: 623,886

[22] Filed: Mar. 29, 1996

[51] Int. Cl.$^6$ .................................................. G06K 7/10
[52] U.S. Cl. ........................................ 235/472; 200/61.02
[58] Field of Search .......................... 200/DIG. 36, 61.87, 200/61.88, 61.28, 61.02; 235/472

[56] References Cited

U.S. PATENT DOCUMENTS

| | | | |
|---|---|---|---|
| 5,140,144 | 8/1992 | Sheppard et al. | 235/472 |
| 5,184,309 | 2/1993 | Simpson et al. | 364/510 |
| 5,200,597 | 4/1993 | Eastan et al. | 233/472 |
| 5,280,150 | 1/1994 | Schultz et al. | 233/472 |
| 5,280,270 | 1/1994 | Correa et al. | 340/471 |
| 5,285,056 | 2/1994 | Tedesco et al. | 235/472 |
| 5,349,497 | 9/1994 | Hanson et al. | 235/472 |
| 5,410,141 | 4/1995 | Koenck et al. | 235/472 |

FOREIGN PATENT DOCUMENTS

| | | | |
|---|---|---|---|
| 0090430 | 3/1990 | Japan | 200/61.02 |
| 406111694 | 4/1994 | Japan | 200/61.02 |

Primary Examiner—Donald T. Hajec
Assistant Examiner—Douglas X. Rodriguez
Attorney, Agent, or Firm—Watts, Hoffmann, Fisher & Heinke Co., L.P.A.

[57] ABSTRACT

A portable data collection device including an integral bar code dataform reader. The device includes a housing configured to be cradled in an operator's hand and be operated as a stand alone unit for dataform reading, data input via user interface keys and a display screen. The device further includes a removable handle with a pistol gripping portion permitting an operator to select between two gripping configurations. The handle is configured to snap fit onto the housing and includes a trigger which is depressed to initiate a dataform reading session. The trigger is part of a trigger assembly which includes an LED and a photosensor supported within a bottom portion of the housing. When the trigger is depressed, a mirror supported by the trigger reflects light from the LED onto the photosensor which results in the activation of the bar code dataform reader. Advantageously, a power source comprising a battery pack is removably disposed in the handle and is electrically coupled to circuitry supported in the housing to supplement a power source supported in the housing and provide increased operating time between rechargings.

10 Claims, 7 Drawing Sheets

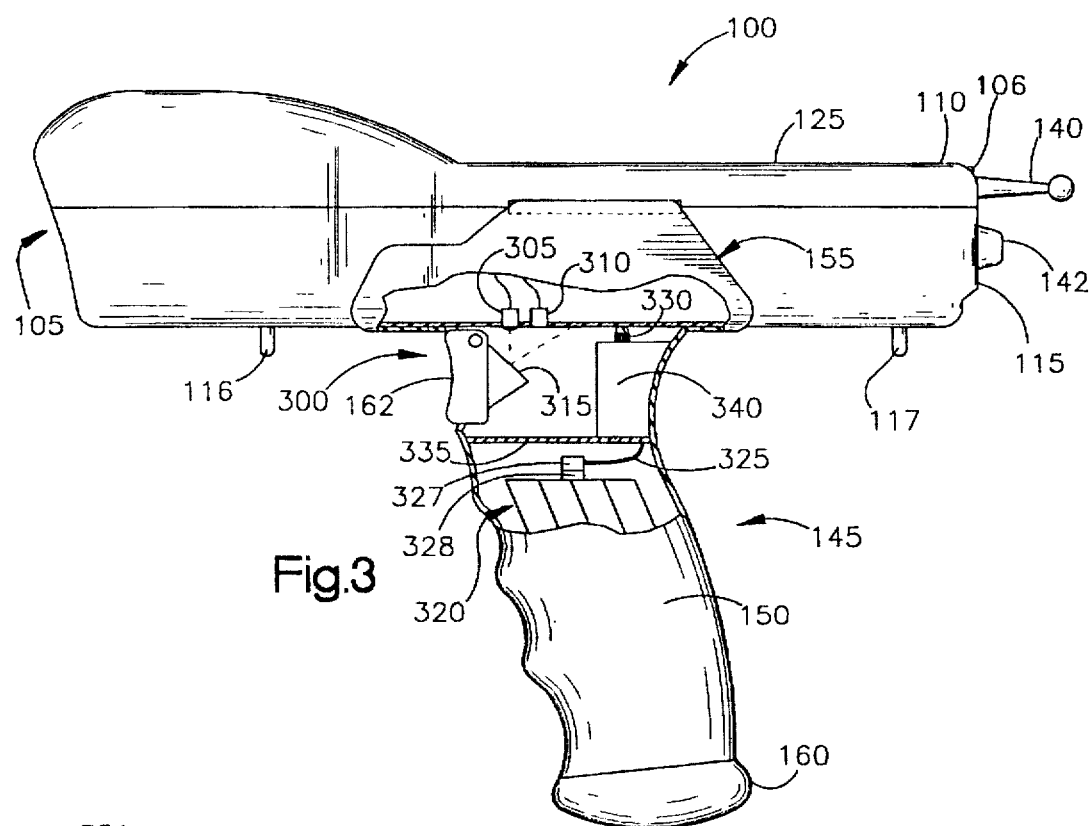
Fig.3
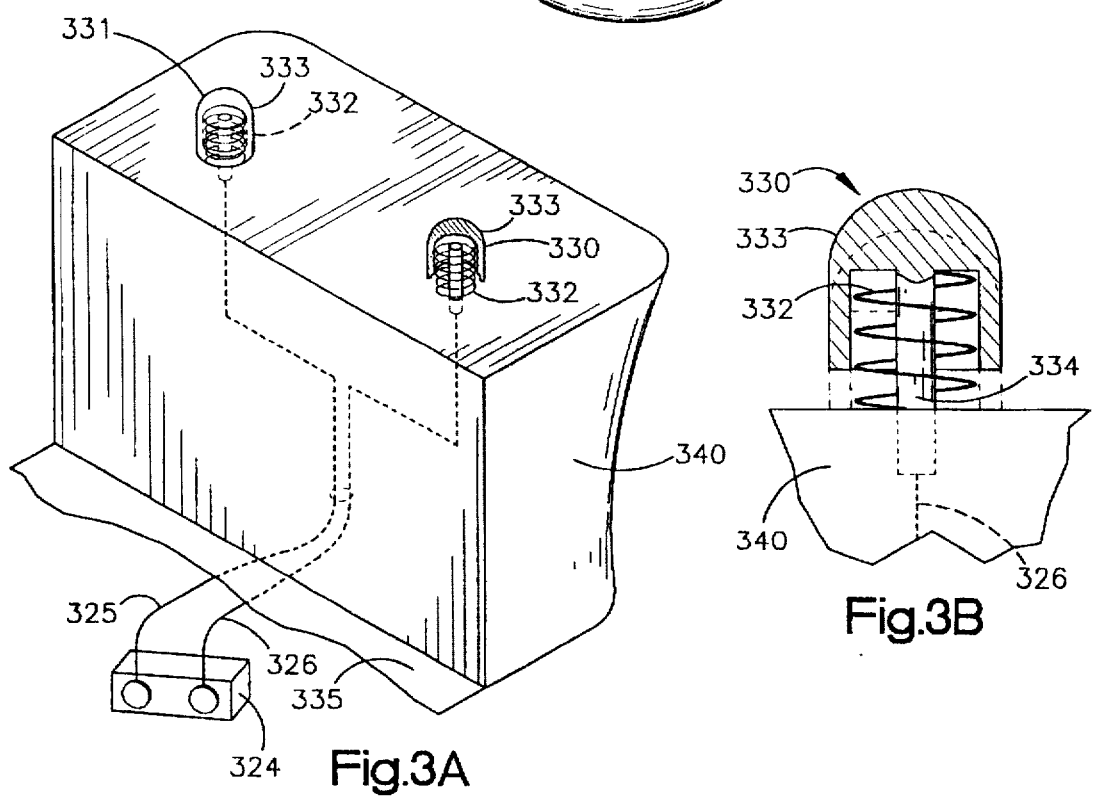
Fig.3A
Fig.3B

PORTABLE DATA COLLECTION DEVICE HAVING REMOVABLE HANDLE AND BATTERY

FIELD OF THE INVENTION

This invention relates generally to a portable data collection device and, more particularly, to a portable data collection device including an integral bar code dataform reader and a removable handle permitting an operator to select between gripping configurations.

BACKGROUND OF THE INVENTION

The use of portable data collection devices including integral bar code readers is widespread in both manufacturing and service industries for pricing, data collection, inventory and quality control, and product tracking functions. For example, a unique stock keeping unit (sku) number may be assigned to each type of product offered by a manufacturer. Each item of a particular product type will have the corresponding sku number encoded in a dataform affixed to the item. Depending on the dataform format, other characteristics of the item and/or the product type may be encoded in the item's dataform including features and options, purchase date or date of manufacture, due date, destination, vendor and/or customer data, etc.

When an item's bar code dataform is read by a bar code dataform reader, the information encoded in the dataform is decoded. In certain cases, some of the decoded information may be displayed to the operator and used as a basis for immediate action such as determining if the item is in the proper location in a plant or warehouse or whether manufacturing operations need to be expedited in view of a due date. In other cases, some or all of the decoded dataform data may be telemetered to a remote computer to update database records such as inventory records or current status or location records in a product tracking system. Retrieved data such as pricing information may be telemetered by the remote computer back to the portable data collection device.

A one dimensional (1D) bar code dataform includes a single row of varying width black or dark colored bars separated by white or light colored bars also of varying width. Bar code readers are typically configured to read a bar code dataform using a laser scanner or an imaging assembly. In a laser scanner, a laser beam is cyclically deflected to repetitively scan across the dataform to be scanned. A photosensor receives reflected light from the scanned dataform and generates an output electric signal. A magnitude of the output signal magnitude of the photosensor will vary as the laser beam scans across dataform. Image processing and decoding circuitry receive the photosensor output signal, generate a representation of the scanned dataform and decode the dataform using an appropriate decoding algorithm.

In an imaging assembly, the bar code dataform to be read is illuminated and reflected illumination is focused by an optic assembly onto a camera assembly photosensor array. A charge accumulating on an individual photosensor of the photosensor array is dependant on an intensity of reflected illumination from the dataform incident on that photosensor. A photosensor or pixel of the photosensor array which has focused onto it light reflected from a light colored portion of the dataform will have a greater charge than a photosensor which has focused onto it light reflected from a dark colored portion of the dataform. Based on a read out of a charge accumulated on individual photosensors comprising the photosensor array, the dataform can then be decoded.

A portable data collection device including a bar code reader is advantageously used at various locations within a facility or between a number of facilities or at remote locations. Externally wired connections to the portable data collection device are typically eliminated in order to maximize user convenience. Therefore, such portable data collection device must be powered by an internal power supply such as a rechargeable battery. The internal battery has a limited amount of power available and must, therefore, be periodically recharged. Unfortunately, given the limited power available from the internal battery, it is not uncommon for an operator's use of a portable data collection device to be interrupted because of low power supply. When this happens, the operator is forced to either obtain a replacement portable data collection device or go to a recharging station and wait for the internal battery to recharge before resuming work activity. Either situation causes undesired and costly delays.

Another major concern related to portable data collection devices is associated with operator ease and comfort in use. More particularly, a portable data collection device is often used over an extended period of time by a single operator and the operation of the portable data collection device typically involves ongoing, repetitive motions. Therefore, the ergonomic design of portable data collection devices has been a continued point of focus and development. Key design concerns often revolve around minimizing operator hand and arm fatigue and avoiding injuries, such as carpal tunnel syndrome, which is based on repetitive motions.

Current designs for portable data collection devices, including bar code dataform readers, are either shaped to be held or cradled in the palm of an operator's hand or configured to be held like a pistol. For example, portable data collection devices designed to fit in the palm of a operator's hand may be configured with a rectangular shaped housing, sized to be held by cradling a lower portion of the housing. A portion of the housing through which light exits and enters the dataform reader is oriented toward at a dataform to be read and an actuation button is depressed to read the dataform. Alternatively, the pistol shaped design commonly involves a cylindrical gripping portion with a trigger extending therefrom and an angled extending snout. The operator grasps the cylindrical gripping portion in his or her hand and "aims" the snout portion at the dataform to be read.

Unfortunately, the ease and convenience of use for each of the rectangular shaped housing and the pistol shaped grip often varies greatly with individual preferences, and operators are forced to conform to which ever style is made available by their employer. Further, even if a desired configuration is available, ongoing and repetitive use of a single style portable data collection device may result in operator fatigue or injuries which lowers overall productivity.

Therefore, it would be desirable to have a portable data collection device including a bar code dataform reader capable of minimizing the problems and concerns discussed above. More particularly, it would be desirable to have a portable data collection device including a bar code dataform reader with the ability to operate over lengthy periods of time without the need to replace or recharge the internal battery supply. Further, it would be desirable to have a portable data collection device which can accommodate the needs of various operator preferences in gripping the device and allow for a means of minimizing injuries caused by ongoing, repetitive use of the device.

SUMMARY OF THE INVENTION

The portable data collection device of the present invention includes an integral dataform reader. The device includes a generally rectangular housing comprising a lower half or chassis contoured to be cradled in a palm of an operator's hand. An upper half or panel of the housing includes a display screen and a keypad to permit the operator to input data and/or commands to a processor controlling circuitry supported within the housing. A detachable handle is affixed to the housing. The device can be operated in a stand alone mode with the handle detached or in a handle attached mode with the handle attached. The housing upper half includes a dataform reading push button to permit the operator to commence a dataform reading session. The detachable handle is configured with a pistol grip and trigger which is a part of a trigger assembly. When the handle is attached to the housing, the trigger may be depressed to initiate a dataform reading session. The detachable handle provides an operator with the option of selecting between two different gripping configurations and permitting an operator to alternate gripping configurations to avoid repetitive motions over a prolonged period.

The trigger assembly includes an LED mounted on a lower portion of the chassis which directs a beam of light toward a mirror attached to the trigger. As the trigger is depressed, light from the LED is deflected by the mirror and strikes a photosensor mounted on a lower portion of the chassis. Activation of the photosensor cause the dataform reader to be actuated to commence a dataform reading session.

The detachable handle supports a removable, rechargeable battery pack which provides a supplementary source of power in addition to power supplied by a battery supported within the housing. The battery pack increases operating time of the device between rechargings.

The aforementioned and other aspects of the present invention are described in more detail in the detailed description and accompanying drawings which follow.

BRIEF DESCRIPTION OF THE DRAWINGS

FIG. 3 is a cut-away sectional view of FIG. 2 with the detachable handle attached to the housing;

FIG. 3A is an enlarged perspective view of a support disposed within an upper portion of an interior region of the handle;

FIG. 3B is a view, partly in elevation and partly in section, of an interfacing prong supported on the support of FIG. 3A;

DETAILED DESCRIPTION OF THE INVENTION

Figure 1:
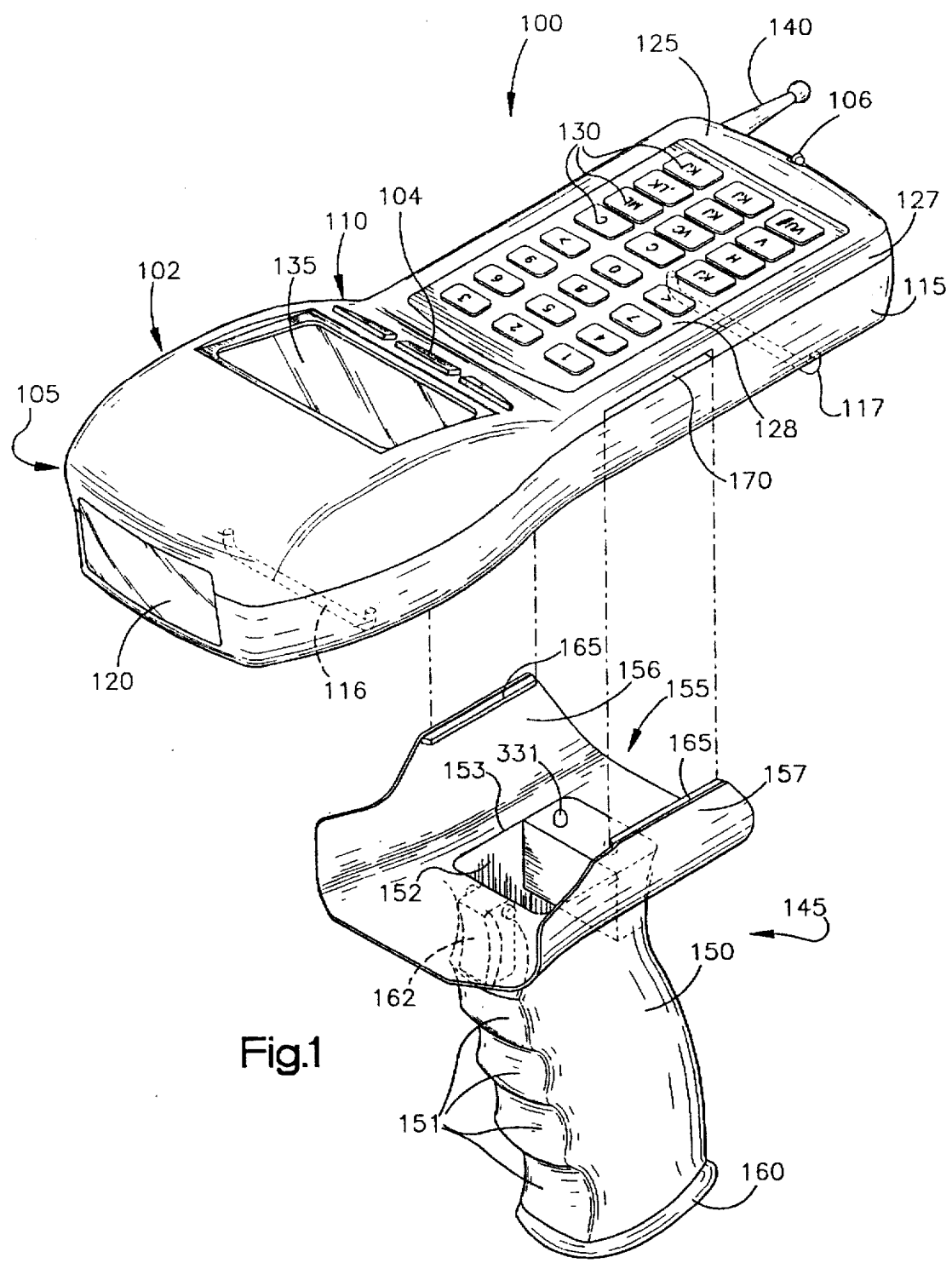
FIG. 1 is a diagrammatic perspective view showing a portable data collection device including an integral bar code reader and a detachable handle of the device, the detachable handle being detached from a housing of the device.
Figure 2:
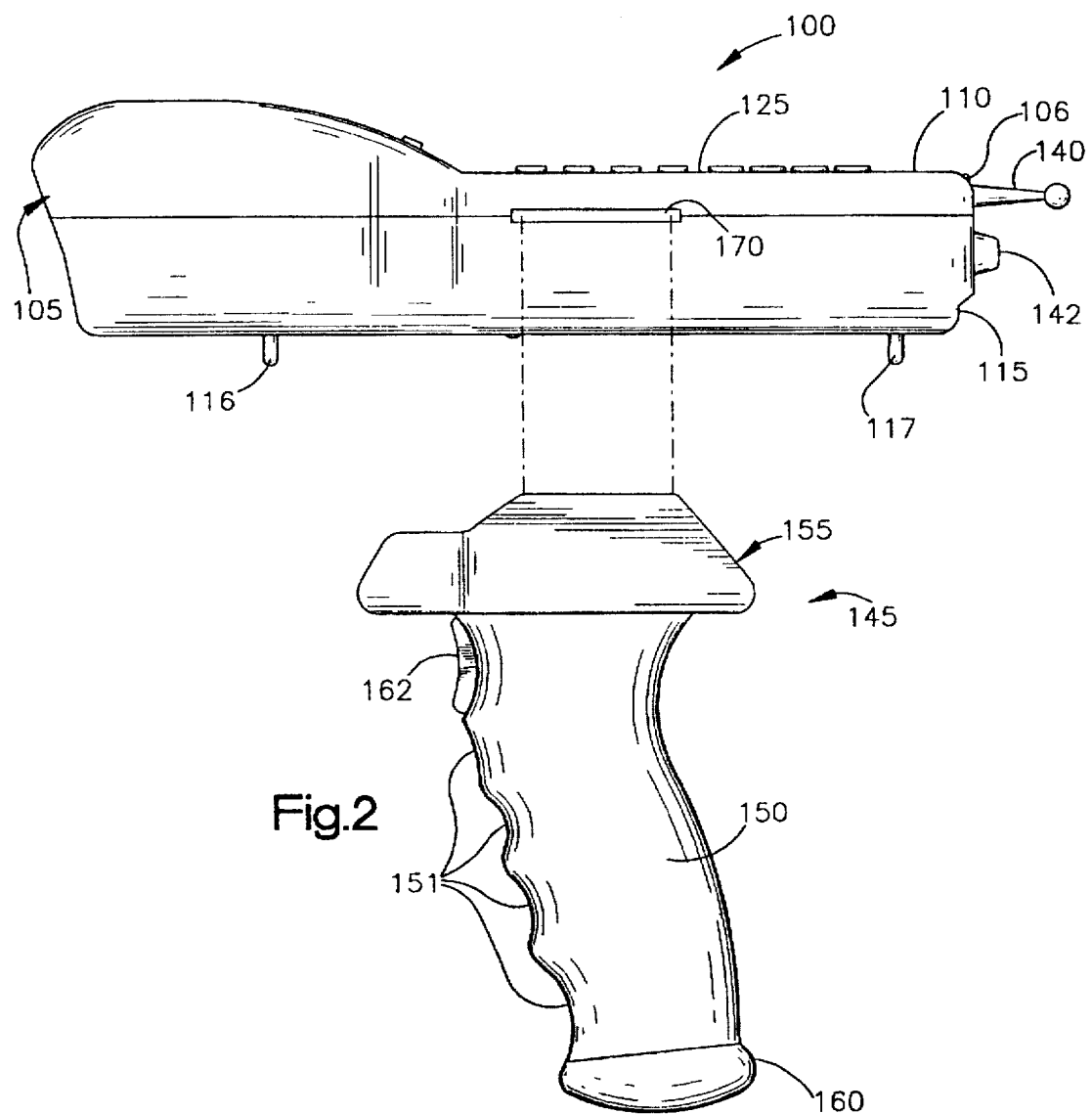
FIG. 2 is a side elevation view of the portable data collection device of FIG. 1.
Figure 7:
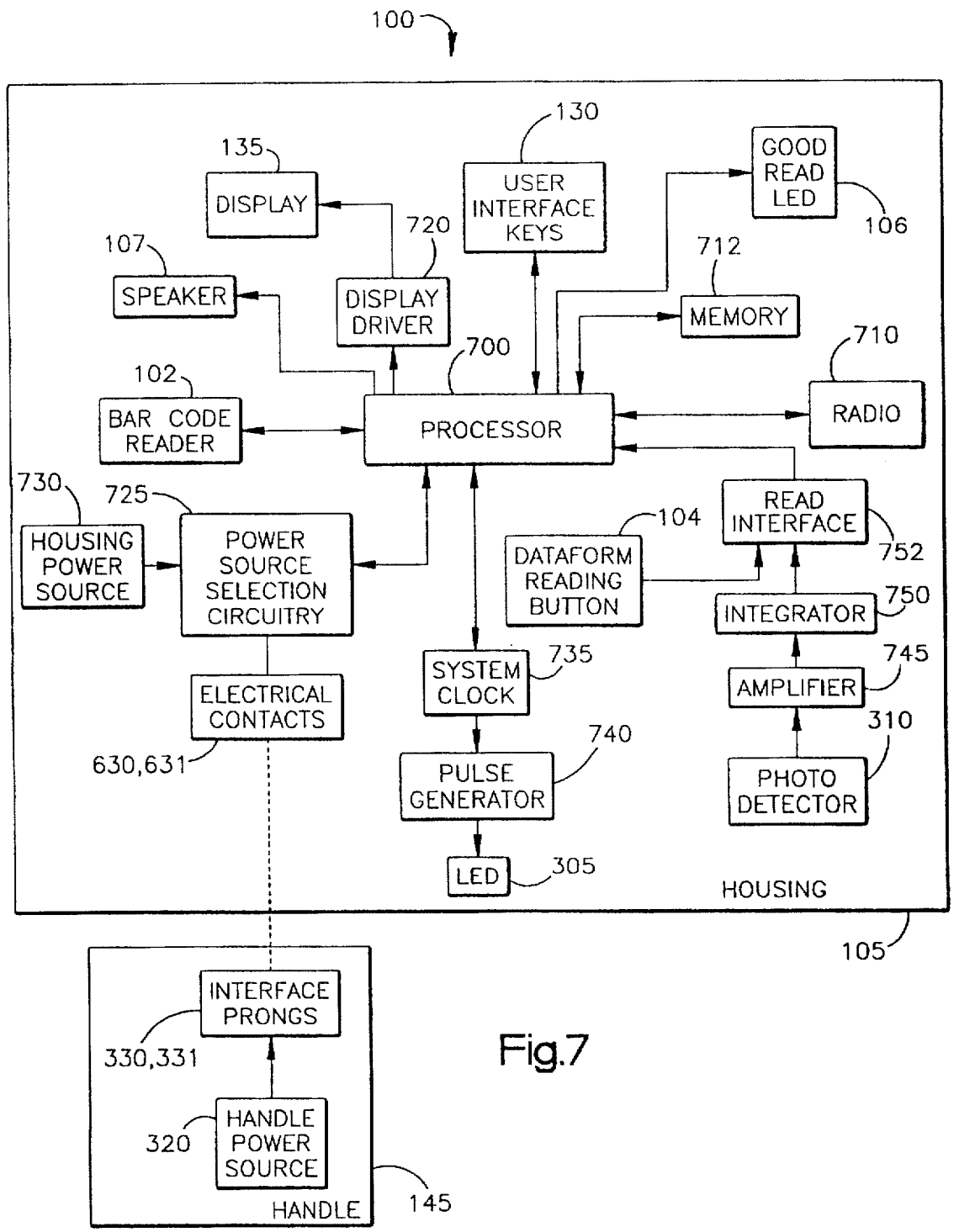
FIG. 7 is a schematic block diagram of selected internal circuitry of the portable data collection device of FIG. 1.

Referring initially to FIGS. 1 and 2, a portable data collection device of the present invention is shown generally at 100. The data collection device includes an integral bar code dataform reader 102 (FIG. 7). The data collection device 100 comprises a housing 105, which houses electronic circuitry including circuitry associated with the dataform reader 102 and circuitry for interfacing with an operator of the device. The housing 105 is composed of two rigid plastic pieces, including an upper half or panel 110, and a lower half or chassis 115. The housing lower half 115 is shaped with a contoured outer surface so as to enable an operator to cradle the device comfortably in a palm of one hand for extended periods of time. Two hand strap hinges 116, 117 are also shown extending from the lower half 115 and accommodate a hand strap 1000 (FIG. 10, to be discussed later) to be attached thereto for additional support and to prevent this device from slipping out of the operator's hand. A clear plastic window 120 is supported in an opening between the housing upper half 110 and the housing lower half 115. The window 120 provides for the exit of light from the dataform reader 102 to illuminate a target bar code dataform (not shown) and the entry of reflected illumination from the target dataform to the dataform reader.

The housing upper half 110 of the portable data collection device 100 is further defined by a top face 125 which supports operator interface assemblies including a manual data entry keyboard 128 including a plurality of keys 130 and a display screen 135. The display screen 135 may be a liquid crystal display (LCD) screen as is commonly used in the art. Also shown protruding through an opening in the housing 105 is an antenna 140. The antenna 140 connects to a radio module 710 (shown schematically in FIG. 7) situated inside of the housing 105 and allows for wireless communication with devices (not shown) connected to a wired backbone of a cellular communication system (not shown). Although the present embodiment shows the antenna 140 protruding through the housing 105, the antenna 140 may alternatively be located within the housing 105 as is well known throughout the art. A serial interface and battery recharging port and 142 (FIG. 2) is also provided. The serial interface may be an RS-232 serial communications port, for example, and further provides an interface for linking the device 100 to external devices to effectuate an exchange of information.

A dataform reading session may be commenced by actuating a dataform reading actuator, which, in the preferred embodiment, is actuated by depressing a dataform reading button 104, shown in FIG. 1, centrally located above the keyboard 128 to allow for both left and right handed use of the device. The dataform reading button 104 is positioned to be easily depressed by a thumb of an operator's hand 146 (see FIG. 8) holding the device 100. Depressing the dataform reading button 104 causes a switch 104', shown schematically in FIG. 7, coupled to the button to send a signal to a processor 700 (FIG. 7) supported within the housing 105. As will be discussed later, the processor 700 controls and coordinates operation of all the circuitry of the device 100. If the dataform reader 102 successfully reads and decodes the target dataform, a light emitting diode (LED) 106 is energized to signal the operator that the dataform read was successful and he or she may go on to the next dataform to be read. The "good read" LED 106 is positioned on an edge of the top surface 125 and a side wall 127 of the housing upper half 110. The position of the good read LED 106 makes it visible to the operator even if the device 100 is being used to read a dataform above the operator's head. Circuitry including a small speaker 107, shown schematically in FIG. 7, for generating an audio signal to signal a good read may also be provided.

Figure 8:
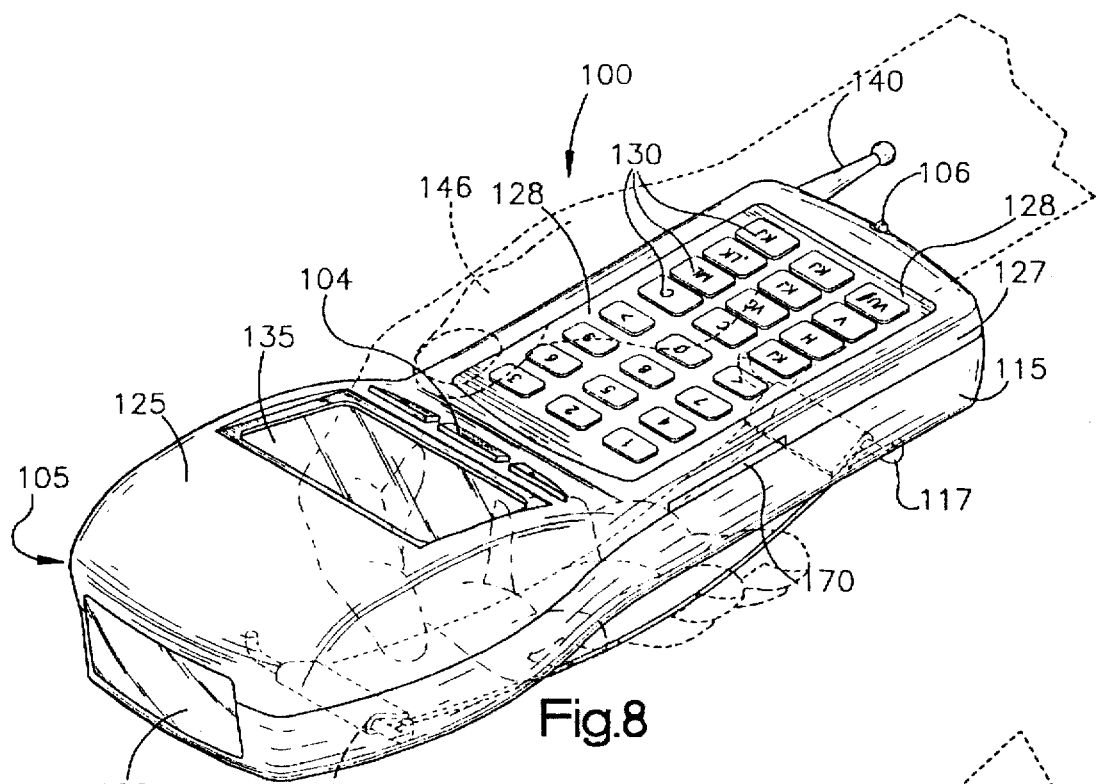
FIG. 8 is a perspective view of the housing cradled in an operator's hand.
Figure 9:
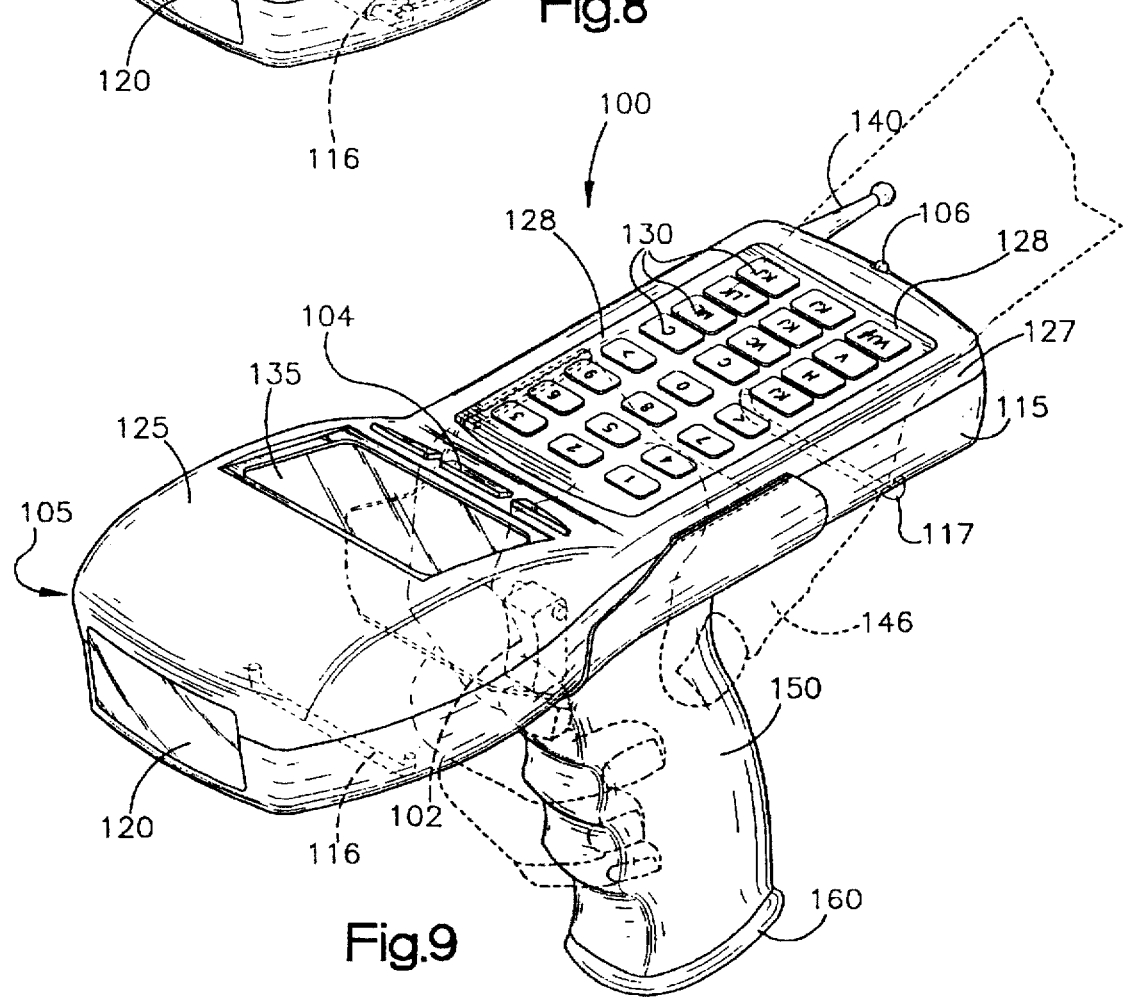
FIG. 9 is a perspective view of the portable data collection device of FIG. 1 with an operator's hand shown gripping the handle.

In accordance with the present invention, FIG. 1 further shows a detachable handle 145 in a detached position from the device 100. The handle 145 includes a pistol grip gripping portion 150 adapted to be grasped by a hand of an operator. An operator may selectively attach or detach the handle 145 from the housing 105 to use the device with a desired gripping orientation, that is, the housing 105 being cradled in a palm of the operator's hand 146 (as seen in dashed line in FIG. 8) or the pistol grip gripping portion 150 being grasped by the operator's hand (as seen in dashed line in FIG. 9). As is seen in FIG. 9, the handle 145 is attachable to the housing 105. Thus, the operator can choose between holding or gripping the device 100 as shown in FIGS. 8 and 9 by simply attaching or detaching the handle 145 from the housing 105. Some operators will prefer one gripping configuration or style or the other, while other operators will prefer to alternate between the gripping configurations to minimize fatigue associated with maintaining the hand holding the device 100 in a certain position for an extended period of time. Still other operators will use one gripping configuration when using the device 100 with their right hand and the other gripping configuration when using the device with their left hand.

In any event, when the handle 145 is removed from the housing 105, the device 100 is operated in what will be defined as the "handle detached" or "stand alone" operating mode, that is, a dataform reading operation or session can only be initiated by depressing the dataform reading key 104. When the handle 145 is attached to the housing 105 the device 100 is operated in what will be defined at the "handle attached" operating mode, that is, a dataform reading session can be initiated by depressing the dataform reading button 104 or, as will be explained below, by depressing a dataform reading trigger 162 supported on the handle 145.

As an additional option, the present invention also allows for a supplemental external power source such as a battery pack 320 (see FIG. 3) to be housed within the handle 145. Upon attaching the handle 145 to the housing 105, the battery pack 320 is coupled to device circuitry within the housing. While there is an internal power source within the housing 105 in form of a rechargeable battery 730 (see FIG. 7), the external handle battery pack 320 provides battery backup in the event the charge on the housing power source battery 730 is drained below a minimum level required by the device circuitry. Further, the battery pack 320 extends the effective operating time of the device 100 between rechargings of the battery 720.

The handle 145 consists of a cylindrical pistol grip gripping portion 150 and a receiving portion 155. The gripping portion 150 includes finger recesses 151 configured to receive fingers of the operator's hand 146 when the gripping portion is grasped (FIG. 9). The gripping portion 150 further includes a removable end cap 160 which, when removed, allows access to an interior region 152 (FIG. 1) of the handle 145 such that the battery pack 320 can be readily inserted or removed. An opening or aperture 153 at the junction between the gripping portion 150 and receiving portion 155 further provides access to the interior portion 152 of the handle whereby electrical connections between the battery pack 320 and the electronics in the housing 105 are made. A hinged trigger 162 is also connected to the base portion 150 and may be use to effectuate a bar code read operation when the handle 145 is attached to the housing 105. Further details pertaining to the hinged trigger 162 is discussed below with reference to FIG. 4. Similar to the housing 105, the handle 145 is made of a high impact plastic.

In the preferred embodiment, a tongue and groove mechanism is used to releasably attach the handle 145 to the housing 105 of the portable data collection device 100. More particularly, the receiving portion 155 of the handle 145 includes two upwardly extending wings 156, 157 each having an inwardly extending elongated tongue 165 adjacent an upper edge of the wing. When the housing 105 is pressed down into the receiving portion 155, each elongated tongue 165 mates with a corresponding groove 170. The receiving portion 155 of the handle 145 is shaped such that the elongated tongue 165 snap-fits within the corresponding grooves 170 thereby securing the handle 145 to the housing 105. In the event the operator desires to disconnect the handle 145 from the housing 105, the operator simply moves one of the winged portions 156, 157 of the receiving portion 155 in an outward direction from the housing 105 such that the tongue is dislodged from its corresponding groove. The handle 145 can then be pivoted with respect to the housing to dislodge the other tongue from its corresponding groove and thereby detach the handle 145 from its respective groove. Of course, this is but one embodiment for connecting the handle 145 to the housing 105 and a variety of other attachment means could readily be used without departing from the essence or scope of this invention.

Referring now to FIG. 3, a cut away portion of the interface between the handle 145 and the housing 105 is shown. As illustrated, housing 105 snugly rests within the receiving portion 155 of the handle 145 and is snap-fit into place by the tongue and groove mating (as discussed above). Once connected, the operator may grip the pistol grip gripping portion 150 of the handle 145 like a handle of a pistol and perform a bar code read by depressing the trigger 162. A trigger assembly 300 is provided to sense when the trigger 162 has been depressed to initiate a dataform reading session. The trigger assembly 300 includes the trigger 162 pivotably hinged to the handle 145, a detector light emitting diode (LED) 305 and a photosensor 310, both supported within the housing 105, and reflective surface, such as a mirror 315 supported by the trigger 162. The mirror 315 is supported by a truss structure 316 and is positioned at an angle with respect to the trigger 162 such that as the trigger is fully depressed, light directed toward the mirror by the LED 305 is reflected from the mirror onto the photosensor 310 (FIG. 4B). The LED 305 is electrically coupled to device circuit components within the housing 105 as will be discussed in more detail below with reference to FIG. 7. The LED 305 emits a light beam which travels along a path labeled 317 (FIGS. 4A and 4B) and reflects off the mirror 315.

Figure 4A:
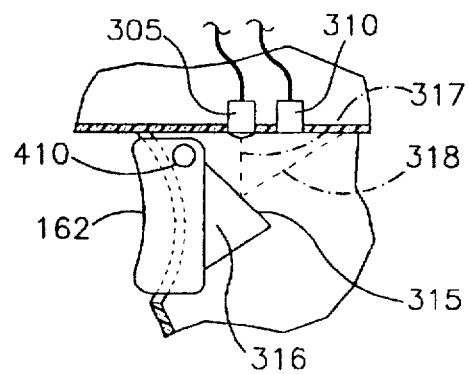
FIG. 4A is an enlarged cut-away sectional view of a trigger assembly of the portable data collection device with the trigger in an undepressed position.
Figure 4B:
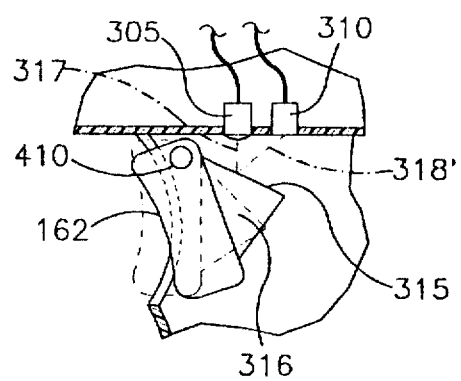
FIG. 4B is the trigger assembly of FIG. 4A showing the trigger in a depressed position.

As can be seen in FIG. 4A, when the trigger 162 is not depressed, that is, the trigger is in an undepressed position, the light beam produces by the LED 305 is reflected by the mirror 315 and travels along a path of travel labeled 318. The path of travel 318 does not intersect the photosensor 310. If, however, as in FIG. 4B, the trigger 162 is depressed, that is, the trigger is pivoted to a fully depressed position, the angle of the mirror 315 with respect to the LED 305 and the photosensor 310 is changed such that the reflected light travels along a path 318' which is incident upon the photosensor 310. Upon excitation by the reflected beam, the photosensor 310 sends a signal to a processor 700 supported within the housing 105 indicating that a dataform reading operation by the bar code dataform reader 102 should be initiated. Details related to the internal circuitry of the portable data collection device 100 is discussed more fully below with respect to FIG. 7.

As noted above, the mirror 315 is attached to the trigger 162 via the truss structure 316. The truss structure 316 is made of the same plastic as the handle 135 and is an integrally molded part of the trigger 162. The mirror 315 may be made of glass coated with a reflective coating. Of course, other reflective surfaces capable of reflecting light could also be used. The trigger 162 is attached to the handle 145 via a hinge 410 and is biased by a spring (not shown) to the undepressed position (FIG. 4A). The hinge 410 permits limited angular movement of the trigger 162 between the positions shown in FIGS. 4A and 4B. Thus, when the trigger 162 is in the position shown in FIG. 4A, the trigger and its attached mirror 315 are positioned such that the light beam is directed along the path of travel 318 away from photosensor 310. However, when the trigger 162 is depressed to the depressed position shown in FIG. 4B, the mirror 315 moves angularly upward, thereby focusing the reflected light beam along the path 318' onto the photosensor 310. When the reflected light is incident on the photosensor 310, the photosensor generates a signal which is coupled to the processor 700 causing the dataform reader 102 to be activated and a bar code dataform reading session to be commenced.

Returning again to FIG. 3, the handle 145 includes a power source which is external to the housing 105. The handle power source preferably includes a battery pack 320 including a plurality of batteries electrically coupled in parallel. The batteries comprising the battery pack 320 could be made of rechargeable compositions such as Li—On+, Ni—Cd or Ni—MH, for example, all well known in the art. A compartment divider 335 divides a portion of the interior region 152 of the handle 145 in which the trigger 162 and the mirror 315 are disposed from a portion of the housing interior in which the battery pack 320 is disposed. The compartment divider 335 further provides a base for a plastic support 340 which, in turn, supports interfacing prongs 330, 331 and portions of two electrical leads 325, 326, each of which is electrically coupled to a respective one of the interfacing prongs 330, 331.

The battery pack 320 is inserted into the base portion 150 of the handle 145 by removing the end cap 160 and sliding the battery pack 320 into the handle. Two electrical leads 325,326 extend through the plastic support 340 and terminate with a connector 327. The connector 327 connects with a mating connector 328 (FIG. 3) of the battery pack 320. A length of the leads 325, 326 outside the support 340 is sufficient to permit connection of the connectors 327, 328 while the battery pack 320 is outside the handle 145. The battery pack 320 may, therefore, be readily inserted, removed, or replaced inside the handle 145 depending on the operator's preference. The leads 325, 326, the interfacing prongs 330, 331 and the connectors 327, 328 provide a portion of a complete electric circuit between the battery pack 320 and circuitry in the housing 105. As seen in FIGS. 3 and 3A, the support 340 is positioned above the compartment divider 335 and provides a base upon which the interfacing prongs 330, 331 are seated. The interfacing prongs 330, 331 extend through the opening 153 (FIG. 1) in the handle receiving portion 155. Both the compartment divider 335 and support 340 are molded of plastic.

Figure 5:
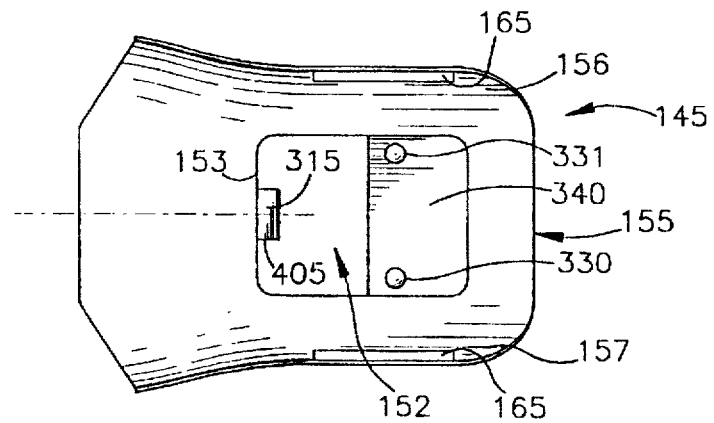
FIG. 5 is a top view of the detachable handle of FIG. 1.

Referring to FIG. 5, a top view of the handle 145 is shown. Completing the circuit between the battery pack 320 and the electrical circuitry supported in the housing 105 are electrical contacts 630, 631 which are accessible to the interface prongs 330, 331 through openings in a bottom portion of the housing lower half 115. Each interface prong 330, 331 is configured to have an internal spring 332, a rounded top 333 and a central conductor 334 electrically coupled at one end to a respective one of the leads 325, 326 and electrically coupled at an opposite end to a respective one of the tops 333 (FIG. 3B). Thus, the prongs 330, 331 can press fit against their corresponding the electrical contacts 630, 631 when the handle 145 is attached to the housing 105. The internal springs 332 of the interfacing prongs 330, 331 provide additional pressure between the tops 333 and the contacts 630, 631 to ensure that positive electrical contact is made between the tops and the central conductors 334 of the interfacing prongs and the contacts.

Figure 6:
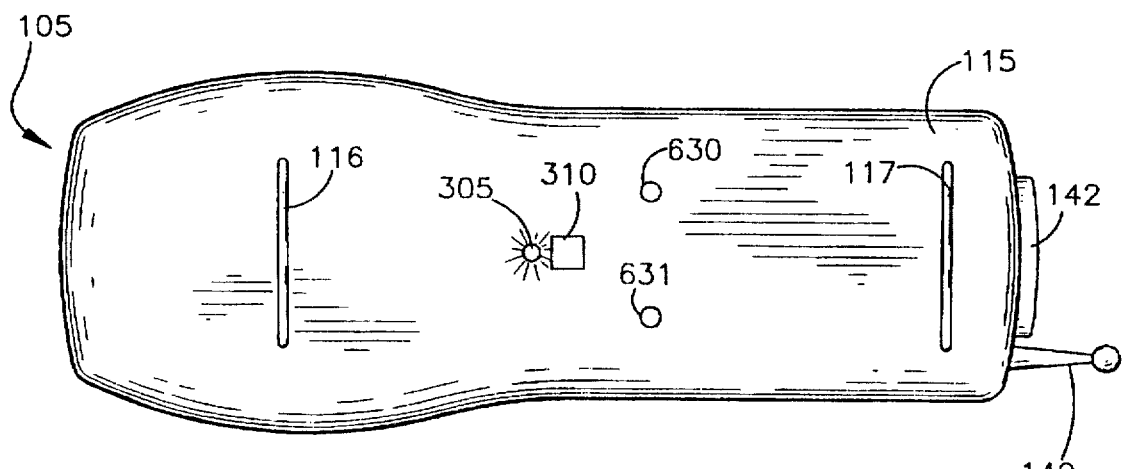
FIG. 6 is a bottom view of the housing of the portable data collection device of FIG. 1.

FIG. 6 is a bottom view of the portable data collection device 100. The LED 305 and the photosensor 310 are both substantially centered along the bottom of the housing lower half 115. Both the LED 305 and photosensor 310 are designed to be flush with an outer surface of the housing lower half 115. Further, an effective light receiving area of the photosensor 310 is approximately one quarter inch by one quarter inch to adequately receive and be excited by the reflected light beam. A thin plano-convex lens (not shown) is mounted over the photosensor 310 to aid in gathering the LED light reflected onto the photosensor by the mirror 315 when the trigger 162 is in the depressed position. The electrical contacts 630, 631 are also supported within the housing lower half 115 and accessible through aligned openings in the housing. Electrical contact 630 interfaces with interfacing prong 330, while electrical contact 631 interfaces with interfacing prong 331. Both electrical contacts 630, 631 are made of a highly conductive metal and both are slightly recessed inside of the housing lower half 115 to protect the contacts when the handle 145 is detached from the housing 105.

In order to initiate a bar code read operation, electronic circuitry supported in the housing 105 is used. The electronic circuitry is used regardless of whether the handle 145 is attached to the portable data collection device 100, that is, whether the portable data collection device 100 is operating in the handle attached mode or the device is operating in a stand alone mode without the handle. It should be appreciated that the key 104 and the trigger 162 are independent, that is, either may be depressed to initiate a dataform reading session. In the stand alone mode of operation, the dataform reading key 104 must be depressed to initiate a dataform reading session since the handle 145 is detached from the housing 105. In the handle attached mode of operation wherein the handle 145 is attached to the housing 105, a dataform reading session may be instituted by either depressing the trigger 162 or depressing the key 104. However, it will normally be the case that in the handle attached mode of operation, the trigger 162 will be utilized to institute a dataform reading session because when the operator grasps the pistol grip gripping portion 150, the operator's fingers will be overlying the finger recesses 151 and the operator's index finger will be adjacent the trigger 162.

Turning now to FIG. 7, a block diagram of selected internal circuitry of the portable data collection device 100 is shown. The processor 700 functions as the central processor of the device 100 and processes all incoming and outgoing signals. Coupled to the processor 700 is the bar code dataform reader 102, the radio module 710, a memory 712, and user interface keys 130. The bar code reader 705 may include a laser scanner of conventional design or a one or two dimensional imaging assembly including a camera assembly with a one or two dimensional CCD photosensor array. Also coupled to the processor 700 through display drive circuitry 720 is the display screen 135. As mentioned above, the display screen is an LCD screen which allows alpha-numeric characters to be displayed to the operator.

In order to provide a means of controlling the power provided by the battery pack 320 and the battery 730 when the device 100 is used in the handle attached operating mode, the internal circuitry includes power source selection circuitry 725 which interfaces with the processor 700 and continually monitors the available battery power from the internal battery 730. If the available internal battery power level is drops to a threshold level, set at a value just above a minimum amount of power needed to operate the device 100, the power source selection circuitry 725 sends a signal to the processor 700 indicating that the internal battery power level is low. The processor 700, in turn, sends a signal to the power source selection circuitry 725 to check if the external battery pack 320 is available and charged, that is, the handle 145 is attached to the housing 105 and the battery pack 320 is at least partially charged. The power source selection circuitry 725 is coupled to the battery contacts 630, 631 as well as the internal battery 730. If the battery pack 320 is available and at least partially charged, the power selection circuitry 725 switches to the battery pack to operate the device electronics. If the battery pack 320 is not available or at least partially charged, the processor 700 is programmed to continually periodically check to see if a new or recharged battery pack is introduced, i.e., if the handle 145 or another interchangeable handle (not shown) has been attached to the housing 105.

Of course, it should be appreciated that the power source selection circuitry 725 could be programmed to first use the power available from the battery pack 320 whenever the handle 145 is attached to the housing 105 and only when the battery pack power available drops to a threshold level just above the level of power need to operate the device circuitry will the housing power source 730 be used. In either event, the availability of a supplemental external power source handle in the handle 145 is advantageously employed to increase an operating period of the device 100 between rechargings. Furthermore, an operator using the device 100 in the stand alone mode may continue operating the device after the housing power source 730 goes "dead" be simply attaching the handle 145 to the housing 105 (assuming, of course, that the handle power source 320 has at least a partial charge) or by obtaining and attaching to the housing another handle which is interchangeable with the handle 145 and has at least a partially charged battery pack.

As a power conserving technique, the portable data collection device 100 provides power to the LED 305 through a pulse generator 740. The pulse generator 740 is connected to the system clock 735 and is set to operate at 10 hertz with a 25% duty cycle. This provides a sufficient number of pulses to the LED 305 to ensure that a trigger 162 depression is never missed yet still allows for significant power savings. Additionally, the photosensor 310 is connected to an amplifier 745 in order to initially amplify any incoming signal from the photosensor. Once amplified, the signal from the photosensor 310 is integrated by integrator 750. Since the LED 305 is pulsed, the integrator 750 is needed to smooth the pulsed signal from the photosensor 310 prior to entering the processor 700. A read interface 752 is further included to provide the processor 700 with a single signal indicative of when a barcode read operation should be performed. The read interface 752 therefore couples an output from the integrator 750 and an output from reading button 104 with the processor 700 thereby allowing for a single signal to enter the processor 700.

In operation, the processor 700 of the present invention is programmed to initiate a dataform reading operation based on receiving an input signal from the photosensor 310 corresponding to the trigger 162 being in the depressed position. The output of the photosensor 310 is continually feed through the amplifier 745 and integrator 750 as discussed above. The processor 700 continually monitors the output signal from the integrator 750 and compares the value of the integrator output signal with a predetermined threshold level stored in the memory 712. When the integrator output signal coming exceeds the predetermined threshold, the processor 700 is programmed to signal the bar code reader 102 to initiate a bar code reading session.

Figure 10:
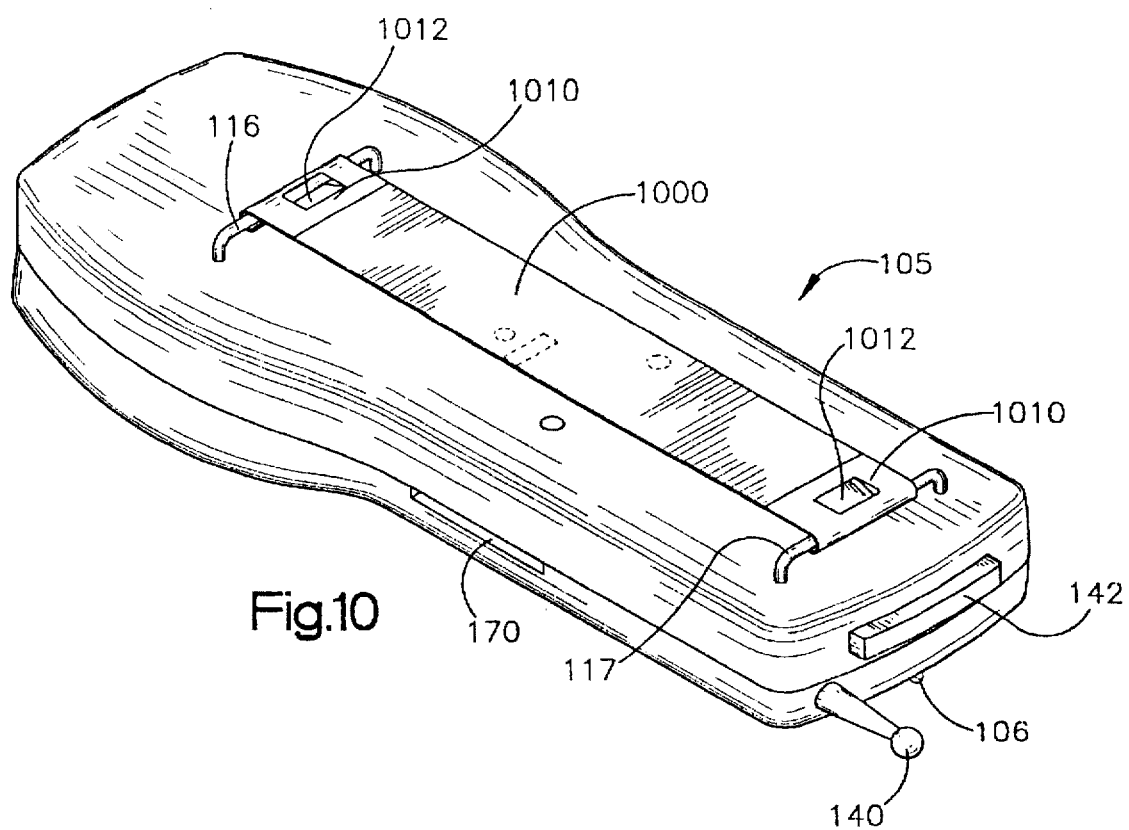
FIG. 10 is a diagrammatic bottom perspective view of the portable data collection device of FIG. 1 with a hand strap attached to the device.

As seen in FIG. 10, to provide further support for the operator's hand 146 when the portable data collection device is used in the stand alone mode and to minimize the risk of damage to the device resulting from inadvertent dropping of the device, the hand strap 1000 may advantageously be attached to strap hinges 116, 117 extending from the bottom portion of the housing lower half 115. The strap 1000 includes buckles 1110 affixed to ends of the strap. The buckles 1110 are sized to slip over central portions of the hinges 116, 117 to removably secure the buckles to the hinges. The buckles 1110 include latch portions 1012 which deflect to permit the buckles to slip over the hinges but prevent the buckles from releasing from the hinges during use of the device 100. To release a buckle 1110 from a respective hinge 116, 117, the latch portion 1012 of the buckle is deflected by finger pressure to create a large enough gap between an end of the latch portion and the buckle to allow the hinge to pass through. Preferably the strap 1000 is comprised of a soft, elastic material approximately one inch wide to provide comfortable support for the operator's hand 146 and be suitable for a range of operator hand sizes.

Although the above discussion relates to preferred embodiments of the present invention, it should be appreciated that various alternative embodiments may also be used. For example, in the preferred embodiment the photodetector 310 is shown to send a signal to the processor 700 upon receiving a reflected light beam 318 when the trigger 162 is fully depressed. However, it may be the case that the photodetector 310 is positioned to receive the reflected light beam 318 prior to the trigger being fully depressed. Alternatively, it may be the case that the photodetector 310 is positioned to continually receive a reflected light beam when the trigger 162 is not depressed, and send a signal to processor 700 to effectuate a bar code read operation upon the light beam being reflected away from the photodetector 310.

Additionally, the position and location of the LED 305, photodetector 310, and mirror 315 may each be rotated or interchanged so long as the intensity of light focused on the photodetector 310 changes when the trigger 162 is depressed. For example, the LED 305 and photodetector 310 may each be positioned inside of the handle 145 while the mirror 315 may be disposed on the lower half 115 of the housing 105. Further, it may be the case that only a photodetector 310 and LED 305 are used in conjunction with the trigger assembly 300 without the need of mirror 315. In such a case, the LED 305 may, for example, be movably positioned to interface with the trigger 162 thereby allowing for a directed light beam to move as a the trigger 162 is depressed. Thus, the photodetector 310 would still be used in a similar fashion as that described above to detect when the trigger 162 is depressed.

While the description has described the currently preferred embodiments of the invention, those skilled in the art will recognize that other modifications may be made without departing from the invention and it is intended to claim all modifications and variations as fall within the scope of the invention.

In compliance with the statute, the invention has been described in language more or less specific as to structural and methodical features. It is to be understood, however, that the invention is not limited to the specific features shown and described, since the means herein disclose comprise preferred forms of putting the invention into effect. The invention is, therefore, claimed in any of its forms or modifications within the proper scope of the appended claims appropriately interpreted in accordance with the doctrine of equivalents.

We claim:

1. A portable data collection device comprising:
   a) a housing for encasing electronic circuitry of the device, the electronic circuitry including circuitry for reading a bar code dataform and power source selection circuitry for selecting between a plurality of power sources electrically coupled to the power source selection circuitry to supply power to the electronic circuitry, the housing supporting a dataform reading actuator, the actuator being selectively actuated to cause the circuitry for reading a bar code dataform to initiate a dataform reading operation;
   b) a housing power source supported by the housing, the housing power source being electrically coupled to the power source selection circuitry and being selectable by the power source selection circuitry to supply power to the electronic circuitry;
   c) a handle removably attached to the housing, said handle including a handle power source;
   d) a trigger movably attached to said handle, said trigger selectively moved to a predetermined position with respect to the handle to cause the circuitry for reading a bar code dataform to initiate a dataform reading operation: and
   e) the electronic circuitry including interfacing circuitry for electrically coupling the handle power source to the power source selection circuitry, the handle power source being selectable by the power source selection circuitry to supply power to the electronic circuitry, the electronic circuitry further including optical trigger detection circuitry for determining when said trigger is moved to the predetermined position with respect to the handle to cause the circuitry for reading a bar code dataform to initiate a dataform reading read operation.

2. The portable data collection device of claim 1 wherein said optical trigger detection circuitry includes a light source and a photosensor and wherein light emitted by the light source is directed onto the photosensor when the trigger is moved to the predetermined position with respect to the handle causing the photosensor to generate an output signal circuitry, causing the circuitry for reading a bar code dataform to initiate a dataform reading operation.

3. The portable data collection device of claim 2 wherein the light source comprises a light emitting diode.

4. The portable data collection device of claim 3 wherein the trigger is pivotably hinged to the handle and supports a reflective surface, the light emitting diode directing light at the reflective surface and wherein when the trigger is moved to the predetermined position with respect to the handle, the reflective surface is moved to a position such that light reflected from the reflective surface is directed onto the photosensor.

5. A portable data collection device comprising:
   a) a housing for encasing electronic circuitry associated with said device, said electronic circuitry including circuitry for reading a dataform;
   b) a handle selectively attachable or detachable from said housing;
   c) a trigger operatively attached to said handle and movable to a predetermined position with respect to the handle to actuate a bar code read operation;
   d) wherein said electronic circuitry further includes optical sensing circuitry for optically sensing when said trigger is moved to the predetermined position with respect to the handle to actuate a dataform reading operation; and
   e) the optical sensing circuitry including a light source and a spaced apart photosensor affixed to the housing and wherein light emitted by the light source is directed onto the photosensor when the trigger is moved to the predetermined position with respect to the handle causing the photosensor to generate an output signal to actuate a dataform reading operation.

6. The portable data collection device of claim 5 wherein the light source comprises a light emitting diode.

7. The portable data collection device of claim 6 wherein the trigger is pivotably hinged to the handle and supports a reflective surface, the light emitting diode directing light at the reflective surface and wherein when the trigger is moved to the predetermined position with respect to the handle the reflective surface is moved to a position such that light reflected from the reflective surface is directed onto the photosensor.

8. An optical method of sensing trigger movement on a detachable handle of a portable data collection device, the device including a housing encasing electronic circuitry including barcode dataform reading circuitry actuatable to read a barcode dataform when the trigger is depressed, said method comprising the steps of:
   a) providing directed light emitted by a light source affixed to the device housing;
   b) reflecting said directed light to be incident on a photosensor affixed to the device housing if said trigger is not depressed, and reflecting said directed light away from said first location if said trigger is depressed;
   c) sensing when said directed light is reflected away from said photosensor; and
   d) providing a signal to actuate the barcode dataform reading circuitry to read the barcode dataform upon sensing that the directed light is reflected away from said photosensor.

9. An optical method of sensing trigger movement on a detachable handle of a portable data collection device, the device including a housing encasing electronic circuitry including barcode dataform reading circuitry actuatable to read a barcode dataform when the trigger is depressed, said method comprising the steps of:

a) providing directed light emitted by a light source affixed to the device housing;

b) reflecting said directed light to a first location if said trigger is not depressed, and reflecting said directed light to be incident on a photosensor affixed to the device housing upon depressing said trigger;

c) sensing when said directed light is reflected to said photosensor; and d) providing a signal to actuate the barcode dataform reading circuitry to read the barcode dataform upon sensing that the directed light is reflected to said photosensor.

10. The method of claim 9, wherein a location of said photosensor substantially corresponds to a location said directed light is reflected upon fully depressing said trigger.

* * * * *